J. PRUTZMAN.
Machine for Pulverizing the Earth Preparatory to Planting.
No. 68,110.
Patented Aug. 27, 1867.
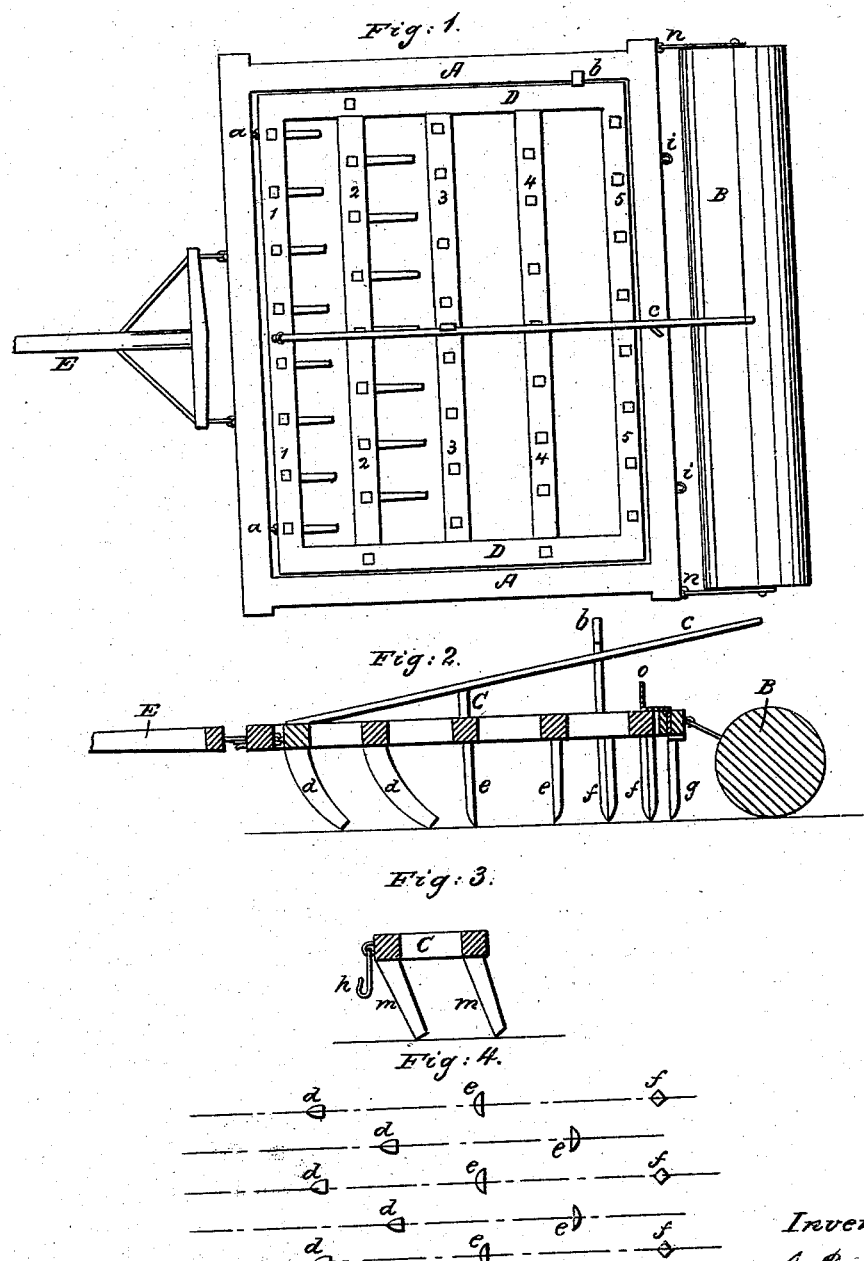

United States Patent Office.

JOHN PRUTZMAN, OF HANCOCK, ILLINOIS.

Letters Patent No. 68,110, dated August 27, 1867.

---

IMPROVEMENT IN MACHINE FOR PULVERIZING THE EARTH PREPARATORY TO PLANTING.

---

The Schedule referred to in these Letters Patent and making part of the same.

---

Be it known that I, JOHN PRUTZMAN, of Hancock county, and State of Illinois, have invented a new and useful Improvement in Machines for Pulverizing the Earth, Preparatory to the Planting of Seed; and I do hereby declare that the following is a full, clear, and exact description of the construction and operation of the same, reference being had to the annexed drawings, making a part of this specification, in which—

Figure 1 is a top view.
Figure 2, a sectional view.
Figure 3, a sectional view of the drag; and
Figure 4, a top view of the knives, shovels, and teeth.

The nature of my invention is to secure a thorough pulverizing of the soil, and at the same time lay off the ground ready for seeding.

To enable others skilled in the art to use and make my invention, I will proceed to describe its construction and operation.

I construct my "American pulverizer" in three separate parts—the pulverizer proper, the drag, and the roller. First part is constructed after the ordinary form of the square harrow, with three different sets or classes of teeth. On the cross-bars 1 and 2 I secure, by means of screws or otherwise, the knives $d\ d$, as shown in fig. 2; on cross-bars 3 and 4 I secure shovels, as shown by $e\ e$, in figs. 2 and 4; on cross-bars 5 I secure a row of ordinary harrow-teeth. These knives, shovels, and teeth are so arranged in their respective cross-bars as that those of each successive row will strike between the furrows made by the preceding row. The frame D, holding the cross-bars 1, 2, 3, 4, and 5, is secured within the outer frame A, by means of hinges $a\ a$, which allow the frame D to be raised so as to be cleaned, or to avoid spots not to be cut and pulverized. When the frame D is thus raised, it rests upon the support $b$. When more weight is desired upon the cross-bars, it is easily acquired by means of pressure upon the lever $c$. In the rear of the outer frame A is placed a larger shovel, $g$, which makes a distinctive furrow as a guide for the sower, so that after the American pulverizer has passed over the soil, the field is laid off and ready for the seed. The roller B and the drag C, (the latter with two rows or more of knives, as shown in fig. 3, by $m\ m$,) are intended to be used, the one or the other, as necessity may justify. When the roller B is to be used, it is attached to the frame A by means of the rods $n\ n$; but the drag C, when used, is to be attached by means of the hook $h$, fig. 3, and the ring $i$ on the rear piece of the frame A. The frame D is secured in the frame A, in the rear, by means of the detent $o$, or its equivalent.

What I claim as my invention, and desire to secure by Letters Patent, is—

The combination of knives, shovels, and teeth, substantially as set forth, and secured in an inner frame, which can be raised or depressed, together with a large shovel or marker for laying off the ground, and the detent $o$, substantially as and for the purpose set forth.

JOHN PRUTZMAN.

Witnesses:
THOS. WHRAY,
THOS. CRAWFORD.